(12) United States Patent
Strütt et al.

(10) Patent No.: US 12,504,732 B2
(45) Date of Patent: Dec. 23, 2025

(54) INTRINSICALLY SAFE AUTOMATION FIELD DEVICE

(71) Applicant: Endress+Hauser SE+Co. KG, Maulburg (DE)

(72) Inventors: Bernd Strütt, Steinen (DE); Christian Strittmatter, Rickenbach (DE); Florian Asal, Aitern (DE); Simon Gerwig, Schopfheim (DE)

(73) Assignee: Endress+Hauser SE+Co. KG, Maulburg (DE)

( * ) Notice: Subject to any disclaimer, the term of this patent is extended or adjusted under 35 U.S.C. 154(b) by 546 days.

(21) Appl. No.: 18/044,221

(22) PCT Filed: Aug. 16, 2021

(86) PCT No.: PCT/EP2021/072675
§ 371 (c)(1),
(2) Date: Mar. 7, 2023

(87) PCT Pub. No.: WO2022/053263
PCT Pub. Date: Mar. 17, 2022

(65) Prior Publication Data
US 2023/0324871 A1 Oct. 12, 2023

(30) Foreign Application Priority Data
Sep. 8, 2020 (DE) ...................... 10 2020 123 409.0

(51) Int. Cl.
*H02H 9/00* (2006.01)
*G05B 19/05* (2006.01)
(52) U.S. Cl.
CPC .. *G05B 19/058* (2013.01); *G05B 2219/14011* (2013.01); *G05B 2219/14012* (2013.01)

(58) Field of Classification Search
CPC ........ G05B 19/058; G05B 2219/14011; G05B 2219/14012; G05B 2219/24028; G05B 9/02; G05B 19/0428; H02H 9/008
See application file for complete search history.

(56) References Cited

U.S. PATENT DOCUMENTS

| 4,025,841 A | 5/1977 | Chambers et al. |
| 5,570,003 A | 10/1996 | Zimmermann |

(Continued)

FOREIGN PATENT DOCUMENTS

| CN | 104615093 A1 | 5/1977 |
| CN | 107124095 A1 | 5/1977 |

(Continued)

*Primary Examiner* — Yongjia Pan
(74) *Attorney, Agent, or Firm* — Mark A. Logan; Endress+Hauser (USA) Holding, Inc.

(57) ABSTRACT

An intrinsically safe field device of automation technology comprises connection terminals via which a current can be supplied; a sensor element and/or actuator element; field device electronics with a current path between the connection terminals and a voltage regulator incorporated into the current path; and an explosion protection unit comprising at least two controllable switching elements, incorporated into the current path in series, and two threshold value circuits designed such that a first threshold value circuit controls a first switching element as a function of a first threshold value, and a second threshold value circuit controls a second switching element as a function of a second threshold value, such that, upon the first and/or second threshold value being reached, the current is limited to the first and/or second threshold value, and the threshold value circuits are connected in parallel to the voltage regulator.

10 Claims, 6 Drawing Sheets

(56) References Cited

U.S. PATENT DOCUMENTS

| | | | |
|---|---|---|---|
| 7,369,386 B2* | 5/2008 | Rasmussen | H05K 1/144 |
| | | | 318/135 |
| 8,482,892 B2* | 7/2013 | Knepler | H03K 17/0824 |
| | | | 361/87 |
| 11,070,053 B2* | 7/2021 | Dent | H02H 9/02 |
| 11,329,481 B2* | 5/2022 | Jensen | H02H 1/0007 |
| 11,721,508 B2* | 8/2023 | Telefus | H01H 83/04 |
| | | | 361/42 |
| 2008/0100976 A1 | 5/2008 | Huczko et al. | |
| 2016/0094025 A1 | 3/2016 | Smith et al. | |

FOREIGN PATENT DOCUMENTS

| | | |
|---|---|---|
| CN | 109565172 A1 | 5/1977 |
| DE | 3622268 C1 | 2/1988 |
| DE | 102008060360 A1 | 6/2010 |
| DE | 102016114032 A1 | 2/2018 |
| DE | 102018118647 A1 | 2/2020 |
| EP | 2973919 B1 | 1/2017 |
| JP | 2000341855 A | 5/1977 |

\* cited by examiner

INTRINSICALLY SAFE AUTOMATION FIELD DEVICE

CROSS-REFERENCE TO RELATED APPLICATION

The present application is related to and claims the priority benefit of DPMA Patent Application No. 10 2020 123 409.0, filed on Sep. 8, 2020, and International Patent Application No. PCT/EP2021/072675, filed Aug. 16, 2021, the entire contents of which are incorporated herein by reference.

TECHNICAL FIELD

The invention relates to an intrinsically safe field device of automation technology for use in an explosion-hazard area.

BACKGROUND

In automation technology, field devices serving to record and/or modify process variables are frequently used, particularly in process automation technology. Sensors, such as fill-level measuring devices, flow meters, pressure and temperature measuring devices, pH redox potential meters, conductivity meters, etc., are used for recording the respective process variables, such as fill-level, flow, pressure, temperature, pH level, and conductivity. Actuators, such as, for example, valves or pumps, are used to influence process variables. The flow rate of a fluid in a pipeline section or a fill-level in a container can thus be altered by means of actuators. In principle, all devices that are used in-process and that supply or process process-relevant information are referred to as field devices. In the context of the invention, field devices also include remote I/O's, radio adapters, and/or, in general, devices that are arranged at the field level.

A variety of such field devices are manufactured and marketed by the Endress+Hauser company.

Many field devices are available in so-called 2-wire versions. In this case, power is supplied to the field device by means of the same two-conductor wire as is used for communication.

Especially in the process industry, but also in automation technology, physical or technical variables must often be measured or determined by the field devices in areas in which there is potentially a risk of explosion—so-called explosion-hazard areas. By means of suitable measures in the field devices and evaluation systems (for example, voltage and current limitation), the electrical energy which is present in the signal to be transmitted can be limited such that an explosion cannot be triggered by this signal under any circumstances (short circuit, interruptions, thermal effects, etc.). For this purpose, corresponding protection principles have been defined in IEC EN DIN 60079-ff.

According to this standard, design and circuitry measures for the field devices for use in explosion-hazard areas are defined on the basis of the ignition protection types to be applied. One of these ignition protection types represents the ignition protection type, "intrinsic safety" (code Ex-i, IEC EN DIN 60079-11, published June 2012).

The ignition protection type, "intrinsic safety," is based upon the principle of current and voltage limitation in a circuit. The energy in the circuit which might be able to ignite an explosive atmosphere is here limited in such a way that ignition of the surrounding explosive atmosphere can take place neither by sparks nor by impermissible heating of the electrical components.

The ignition protection type, "intrinsic safety," defines three protection levels: Ex-ia, Ex-ib, and Ex-ic. In this case, the highest level is defined by level a, at which two countable faults in their combination do not lead to a malfunction and thus cause ignition (2-fault safety). Level b defines that one countable fault does not lead to a malfunction and thus cause an ignition (1-fault safety). In the case of level c, accordingly, no fault safety is defined, so that, in the case of one malfunction, an ignition can already be triggered (0-fault safety).

A critical area in which a possible ignition of the surrounding explosive atmosphere can occur are the connection terminals of a field device to which the two-wire line is connected.

Usually, therefore, a short-circuit current which can act on the connection terminals is limited with the aid of an explosion protection unit. The explosion protection units known from the prior art usually comprise, for power limitation, one or more Zener diodes for voltage limitation and, in series therewith, one or more explosion-protection resistors in combination with a fuse for maximum current limitation, wherein, furthermore, a mains-side reflux of the energy from the inductors L and/or the capacitors C is prevented with additional diodes. The explosion protection units are usually designed such that the one or more explosion-protection resistors has or have a total resistance of approximately 330 ohms.

The disadvantage of these explosion protection units is that, during normal operation at, for example, a terminal voltage Uk=24 V and a fault current of 22 mA, a voltage drop of 7.26 V (with 330 ohm resistance) would occur. This corresponds to a power loss at the explosion-protection resistor of ⅓ of the total power available.

As a result of this loss of performance, only energy-efficient components can be used for the device circuit. The development of field device electronics is also becoming significantly more complex and thus more expensive. In addition, functional disadvantages arise, such as, for example, losses in measuring performance and also in a visual or digital representation of the measured value (e.g., by a display or via Bluetooth, etc.).

SUMMARY

The object of the invention is therefore to overcome the aforementioned disadvantages.

The object is achieved according to the present disclosure by the intrinsically safe automation field device according to the present disclosure.

The intrinsically safe automation field device for use in an explosion-hazard area comprises:
- a first and a second connection terminal for connecting a two-wire line via which a current can be supplied;
- a sensor element and/or actuator element for capturing and/or setting a process variable;
- field device electronics connected to the first and second connection terminals, said field device electronics conducting the current Is, which can be supplied via the two-wire line, via a current path from the first to the second connection terminal, wherein the field device electronics have a voltage regulator incorporated into the current path, said voltage regulator being designed to provide, on the basis of the supplied current Is, a power supply at least for the sensor element and/or actuator element, wherein the field device electronics further are designed to transmit the process variable, captured via the sensor element, by setting the current Is to a corresponding value, and/or to receive a process variable, to be set by the actuator element, by reading the current Is and to adjust the actuator element accordingly;

an explosion protection unit comprising at least a first and a second, actively-controllable switching element incorporated in series into the current path, as well as at least a first and a second threshold value circuit, which are designed such that the first threshold value circuit controls the first controllable switching element as a function of a first threshold value of the current Is, and the second threshold value circuit controls the second controllable switching element as a function of a second threshold value of the current Is, such that, upon the first and/or second threshold value being reached, the current Is is limited to the first and/or second threshold value, and wherein the threshold value circuits are connected in parallel to the voltage regulator incorporated into the current path.

According to the invention, instead of the ohmic explosion-protection resistor or the ohmic explosion-protection resistors in the explosion protection unit, actively-controllable switching elements in the explosion protection unit are incorporated into the current path as current limitation, which are in each case controlled via a threshold value circuit.

An advantageous embodiment of the field device according to the invention provides that the explosion protection unit further comprise a third, actively-controllable switching element, incorporated into the current path in series with the first and second switching elements, and also a third threshold value circuit which is designed in such a way that the third threshold value circuit controls the third controllable switching element as a function of a third threshold value of the current Is, wherein the threshold value circuits are designed such that, upon the first, second, and/or third threshold value being reached, the current Is is limited to the first, second, and/or third threshold values, and wherein the third threshold value circuits are also connected in parallel to the voltage regulator incorporated into the current path.

A further advantageous embodiment of the field device according to the invention provides that the first, second, and/or third threshold value of the current Is be greater than 22 mA, in particular in the range of 32-40 mA.

A further advantageous embodiment of the field device according to the invention provides that the first, second, and/or third threshold value circuit be designed such that at least two of the three, preferably all, threshold values are essentially the same.

An alternative embodiment of the field device according to the invention provides that the first, second, and/or third threshold value circuit be designed such that at least two of the three threshold values of the current Is differ from one another.

A further advantageous embodiment of the field device according to the invention provides that the actively-controllable switching elements comprise a semiconductor switching element or a transistor. The use of semiconductor switching elements, e.g., in the form of field effect transistors (MOSFET's), has the advantage that, in normal operation, they generate a really small voltage drop of <1 V. The power drop as well is also really small (<5%).

A further advantageous embodiment of the field device according to the invention provides that the threshold value circuits in each case comprise at least two transistors.

A further advantageous embodiment of the field device according to the invention provides that the field device electronics further have a shunt resistor, which is incorporated into the current path in series with the voltage regulator, and the field device electronics be further configured to read back the current Is via the shunt resistor, and wherein, by at least one voltage tap across the shunt resistor, the first, second, and/or third threshold value circuit realizes or realize the first, second, and/or third threshold value of the current Is being reached. In particular, the embodiment can provide that at least one, preferably all, of the threshold value circuits in each case comprise at least two transistors, and the at least two transistors be in each case connected to one another and to the respective actively-controllable switching element and also to the shunt resistor such that the respective switching threshold is essentially determined by the shunt resistor.

A further advantageous embodiment of the field device according to the invention provides that at least one, preferably all, of the threshold value circuits in each case comprise at least one comparator, a transistor, and a voltage divider, which are connected to one another and to the respective actively-controllable switching element in such a way that the respective switching threshold is essentially determined by the voltage divider.

BRIEF DESCRIPTION OF THE DRAWINGS

The invention is explained in more detail on the basis of the following drawings. The following are shown.

DETAILED DESCRIPTION

Figure 1:
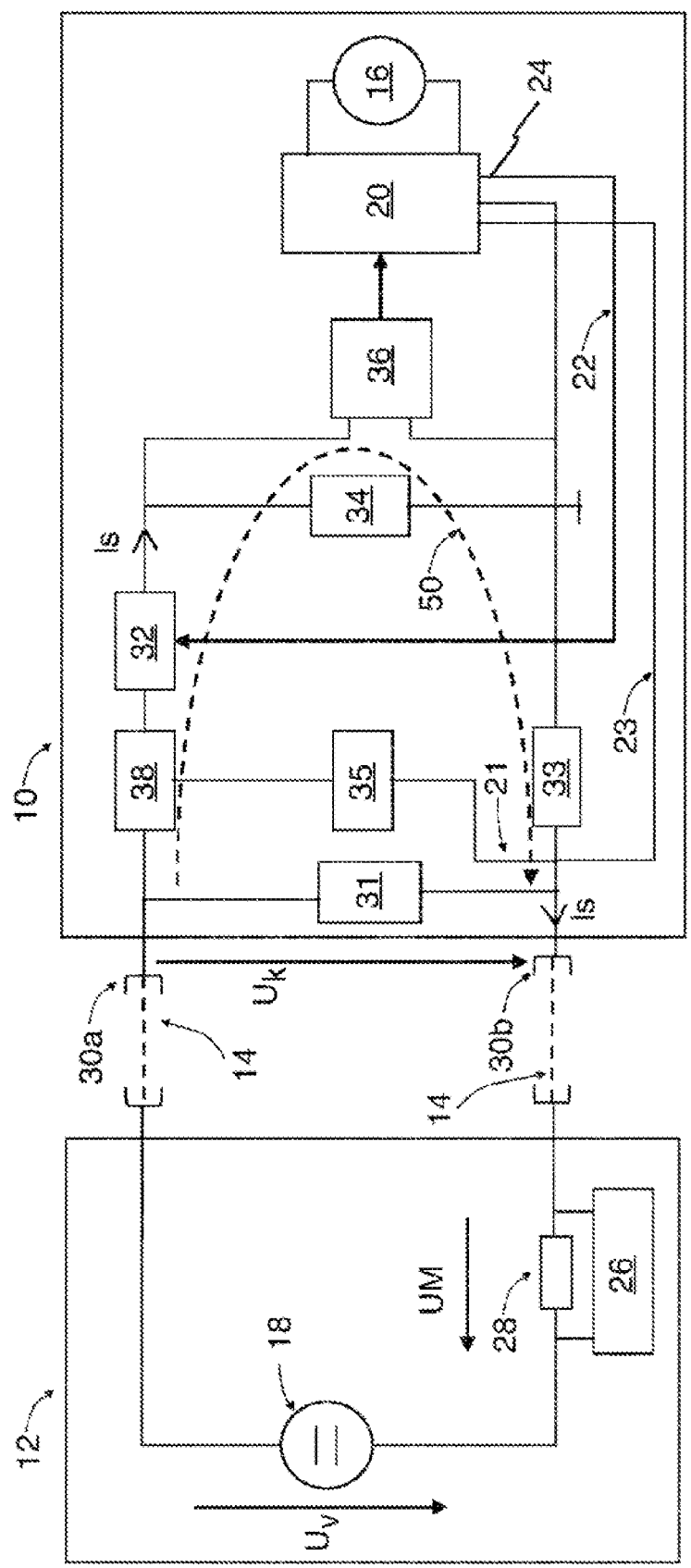
FIG. 1 shows a schematic representation of a field device which is connected to a higher-level unit via a two-wire line for signal and energy transmission.

FIG. 1 shows a schematic representation of a field device 10, which is connected, via first and second connection terminals 30a and 30b, to a two-wire line 14 for signal and energy transmission. The two-wire line 14 is in turn connected at the other end to a higher-level unit 12. In the example shown, the field device 10 is a measuring point at which a measured value or process variable (for example, temperature, pressure, humidity, fill-level, flow) is captured with the aid of a sensor 16. However, the field device could just as well also be an actuator location in which a process variable is set with the aid of an actuator.

The field device 10 does not contain its own energy source, but instead draws the supply current required for its operation via the two-wire line 14. This can be provided, for example, by a voltage source 18 contained in the higher-level unit 12. Via the same two-wire line 14, a measured value signal representing the measured value just measured is transmitted from the field device 10 to the higher-level unit 12. In accordance with a conventional technique, the measured value signal is a signal current Is flowing via the two-wire line 14, which can change between two, prespecified values (usually, the current values, 4 mA and 20 mA). The voltage source 18 supplies a DC voltage Uv, and the measurement current Is is a direct current.

For measurement value acquisition, the field device 10 contains the already-mentioned sensor 16 and a measuring transducer circuit 20 connected thereto, which controls a controllable current source via a control line 22 in such a way that the measurement current Is is set to a value (signal current) representing the captured measured value.

The higher-level unit 12 contains an evaluation circuit 26 which obtains the measured value information from the signal current Is transmitted via the two-wire line 14. For this purpose, into the two-wire line, a measuring resistor 28 is inserted, at which a voltage UM is generated, which is proportional to the signal current Is transmitted via the two-wire line and is fed to the evaluation circuit 26.

By means of internal field device electronics, the signal current Is is guided in the field device 10 by a current path 50 from the first to the second connection terminal 30a, 30b. The current Is can be set via a controllable current regulator, incorporated into the current path 50, or current sink 32. The current regulator is correspondingly controlled by a signal output by the measuring transducer circuit 20 at the output, which signal is supplied as a control signal to the current regulator 32 via the control line 22. Depending upon the measured value captured in each case, the signal current Is flowing in the two-wire line is thus set by a corresponding control of the current regulator or current sink 32. The current regulator or current sink can comprise, for example, a transistor, which is regulated by the control signal from the measuring transducer circuit 20. In the case where the field device is designed as an actuator, i.e., has an actuator element instead of a sensor element, the current regulator is omitted.

The field device further comprises a low-impedance shunt resistor 33, via which the signal current Is is read back through the measuring transducer circuit 20 by means of a read-back line 23. According to Ohm's law, a voltage U_shunt=R_shunt·Is drops at the shunt resistor 33. The voltage U_shunt is thus proportional to the current Is flowing through the field device. In order to regulate the signal current Is to be set, the voltage dropping across the shunt resistor 33 is supplied to the measuring transducer circuit. Shunt resistors 33 of this type are indispensable for regulating the current signal, corresponding to a measured value determined by the sensor for a field device, and typically have a resistance value in the range of 5-40 ohms, preferably 7-30 ohms, particularly preferably in the range of 10-25 ohms.

As can be seen from FIG. 1, the field device 10 further contains a voltage regulator 36, e.g., in the form of a switching or linear controller, the task of which consists in generating as constant an operating voltage as possible for the measuring transducer circuit 20 and the sensor 16. The input voltage for the voltage regulator 36 can be provided, for example, by a voltage source 34, in particular in the form of a capacitor. The voltage source 34 supports the input voltage or terminal voltage Uk, which is provided by the voltage source 18 contained in the higher-level unit 12. The voltage source 34 thus serves as a "source" for the circuit parts connected to it, in particular for the voltage regulator 36.

The use of the voltage regulator 36 in conjunction with the voltage source 34 makes it possible to always provide the measuring transducer circuit 20 and the sensor 16 with the highest possible power. The voltage regulator 36 ensures that, despite an increase in its input voltage Ue, the operating voltage of the measuring transducer circuit 20 and of the sensor 16 is kept at a constant value, so that a higher input power is available by increasing the input voltage Ue at the voltage regulator 36, which thus also enables a higher output power.

In the case of a measured value acquired by the sensor 16, which lies at the lower end of the measurement value range, the signal current Is also assumes the lower value of the signal current range. In the usual 4-20 mA technology, therefore a value of 4 mA. Correspondingly, in the case of a measured value captured by the sensor 16, which lies at the upper end of the measurement value range, the signal current Is assumes the upper value of the signal current range. In the usual 4-20 mA technology, therefore a value of 20 mA.

For voltage limitation, a voltage-limiting circuit 31 can be connected in parallel to the external voltage source between the first and second connection terminals. The voltage limiting circuit 31 can be formed, for example, from Zener diodes.

Figure 2:
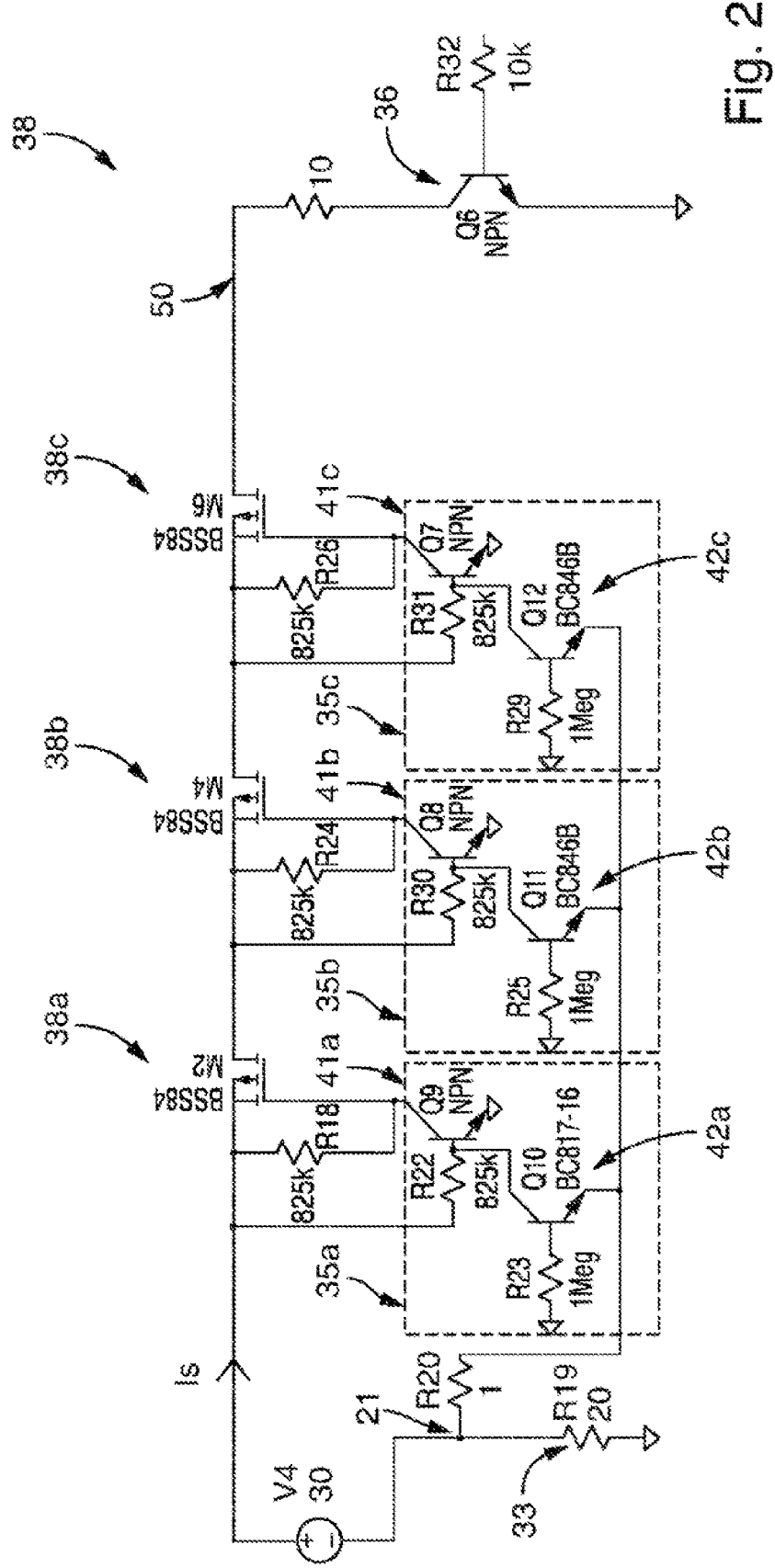
FIG. 2 shows a first variant, shown in detail, of an explosion protection unit designed according to the present disclosure.
Figure 3:
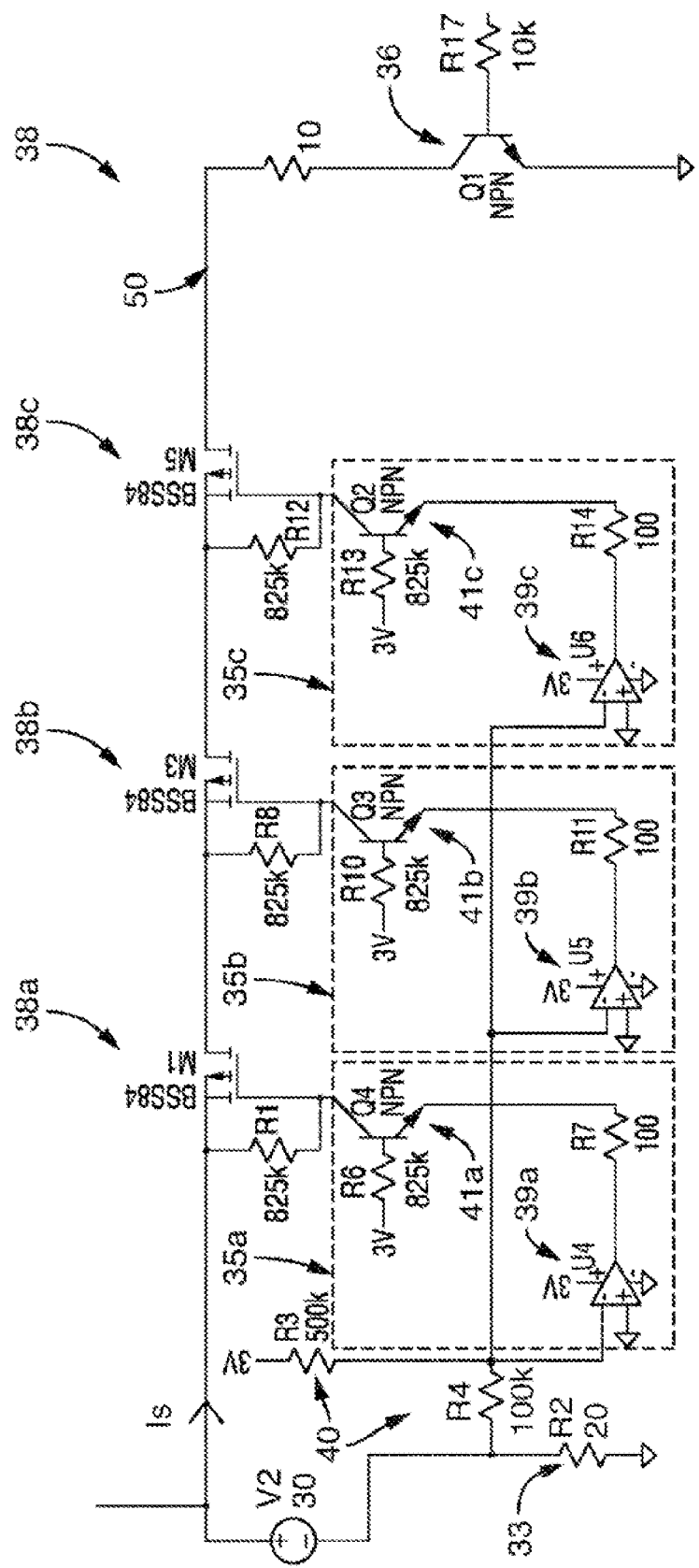
FIG. 3 shows a second variant, shown in detail, of an explosion protection unit designed according to the present disclosure.

Furthermore, the field device comprises an explosion protection unit 35, 38, designed according to the invention, which serves for current limitation. In FIG. 1, the explosion protection unit is indicated only by way of example. FIG. 2 and FIG. 3 show in detail a first and a second variant of an explosion protection unit.

The explosion protection unit 35, 38 comprises at least a first and a second, actively-controlled or controllable switching element 38a and 38b as well as a first and a second threshold value circuit 35a and 35b, each of which controls a switching element. The explosion protection unit is used for current limitation.

Depending upon the desired protection level and according to the requirements of standard IEC EN DIN 60079-11, published in June 2012, the explosion protection unit can also have a third switching element 38c and a third threshold value circuit 35c, as is shown by way of example in FIGS. 2 and 3.

The actively-controlled or controllable switching element 38a, 38b, and 38c can be realized, for example, as semiconductor switching elements, such as field effect transistors, in particular MOSFET's, or as transistors, in particular bipolar transistors.

The circuit elements 38a, 38b, 38c, in series with one another and in series with voltage regulator 36, are incorporated into the current path 50. The threshold value circuits 35a, 35b, 35c are, on the other hand, incorporated in parallel to the voltage regulator 36, which serves, so to speak, as a load.

In the case where the switching elements 38a, 38b, 38c are designed as field effect transistors, this offers the advantage that the provision of a required gate-source voltage can be dispensed with, compared to conventional current limiters. Here, the stroke is realized as a load via the voltage regulator 36.

The threshold value circuits are basically constructed in such a way that they each actuate the corresponding switching element as a function of a threshold value of the current Is flowing in the current path 50. The actuation takes place in such a way that, upon the respective threshold value being reached, the current Is flowing in the current path 50 will be limited to the respective threshold value. The threshold values of the current Is are greater than 22 mA (Is>22 mA) and in particular lie within the range of 32-40 mA. The threshold value circuits 35a, 35b, 35c can now be designed such that they all have the same threshold value, or, alternatively, the threshold values are at least in some cases different.

In order to not have to generate an additional voltage drop and thus a power loss, a voltage tap 21 required for ascertaining the current value can be implemented across the shunt resistor 33.

In detail, the threshold value circuits can be designed differently. Thus, as shown in FIG. 2, the first, second, and third threshold value circuits 35a, 35b, 35c can in each case be consist of a transistor circuit with at least two transistors, especially bipolar transistors. The transistor circuits 35a, 35b, 35c are each designed such that the respective switching element 38a, 38b, 38c is controlled via a collector-emitter path of the first transistor 41a, 41b, 41c, wherein the control signal is supplied to the base of the first transistor 41a, 41b, 41c via a collector-emitter path of the second transistor 42a, 42b, 42c. The voltage is tapped at the shunt resistor 33 in this case via the emitter of the second transistor. If necessary, as shown in FIG. 2, a further resistor can be connected between the tapping point and the emitter of the second transistor. According to this variant, the respective switching threshold is essentially determined by the shunt resistor (33) or by the resistance value of the shunt resistor.

FIG. 3 shows another variant of an explosion protection unit 35, 38, designed according to the invention. The first, second, and third threshold value circuit 35a, 35b, 35c in each case have a comparator 39a, 39b, 39c and a transistor 41a, 41b, 41c. Furthermore, the explosion protection unit has a voltage divider 40. The voltage tap across the shunt resistor 33 is effected here by the voltage divider. A center tap of the voltage divider 40 is connected to the inverting inputs of the comparators, so that the respective switching threshold is essentially determined by the voltage divider 40, i.e., by the resistance ratio of the two resistors of the voltage divider.

Figure 4A:
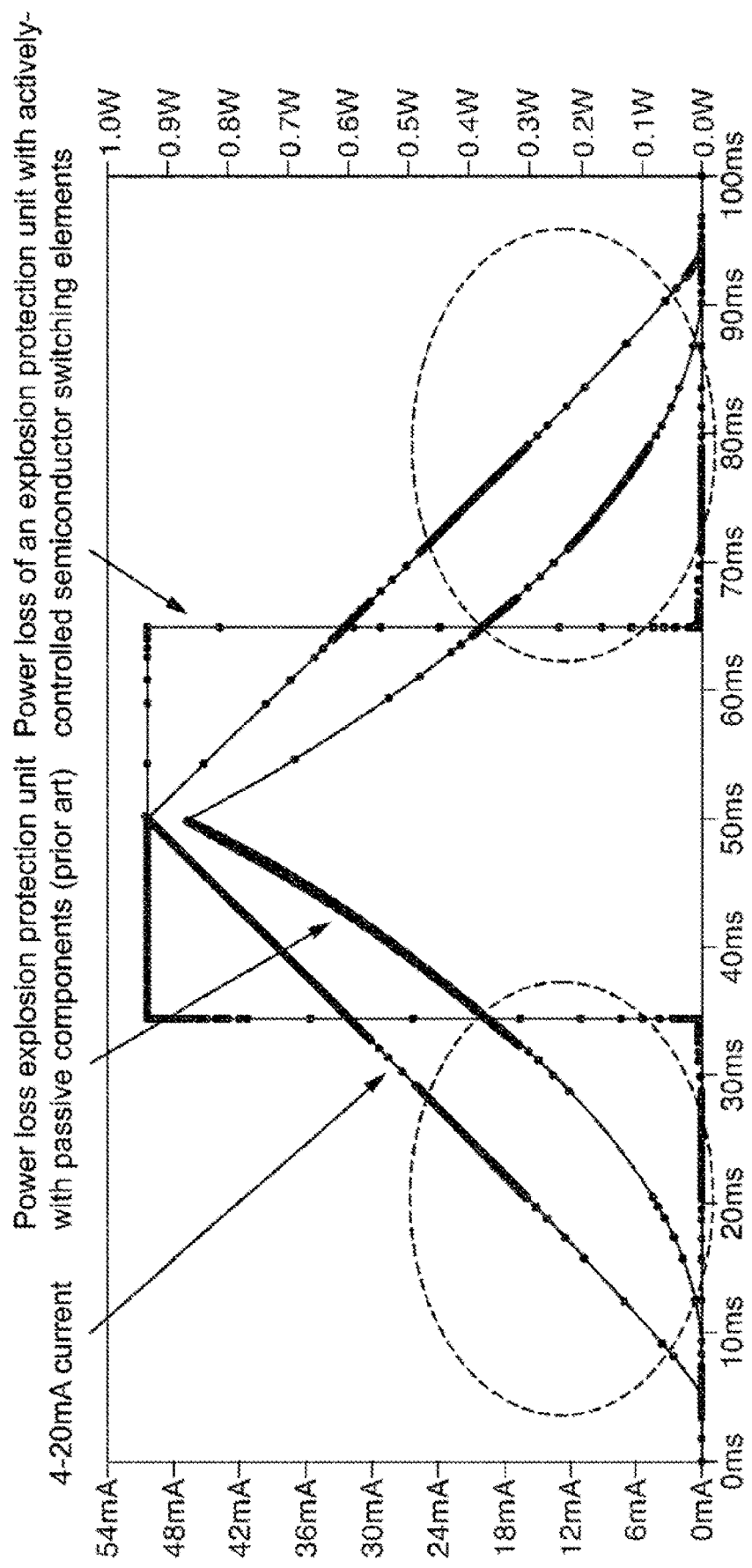
FIGS. 4a-4c show circuit simulations of the explosion protection unit.
Figure 4B:
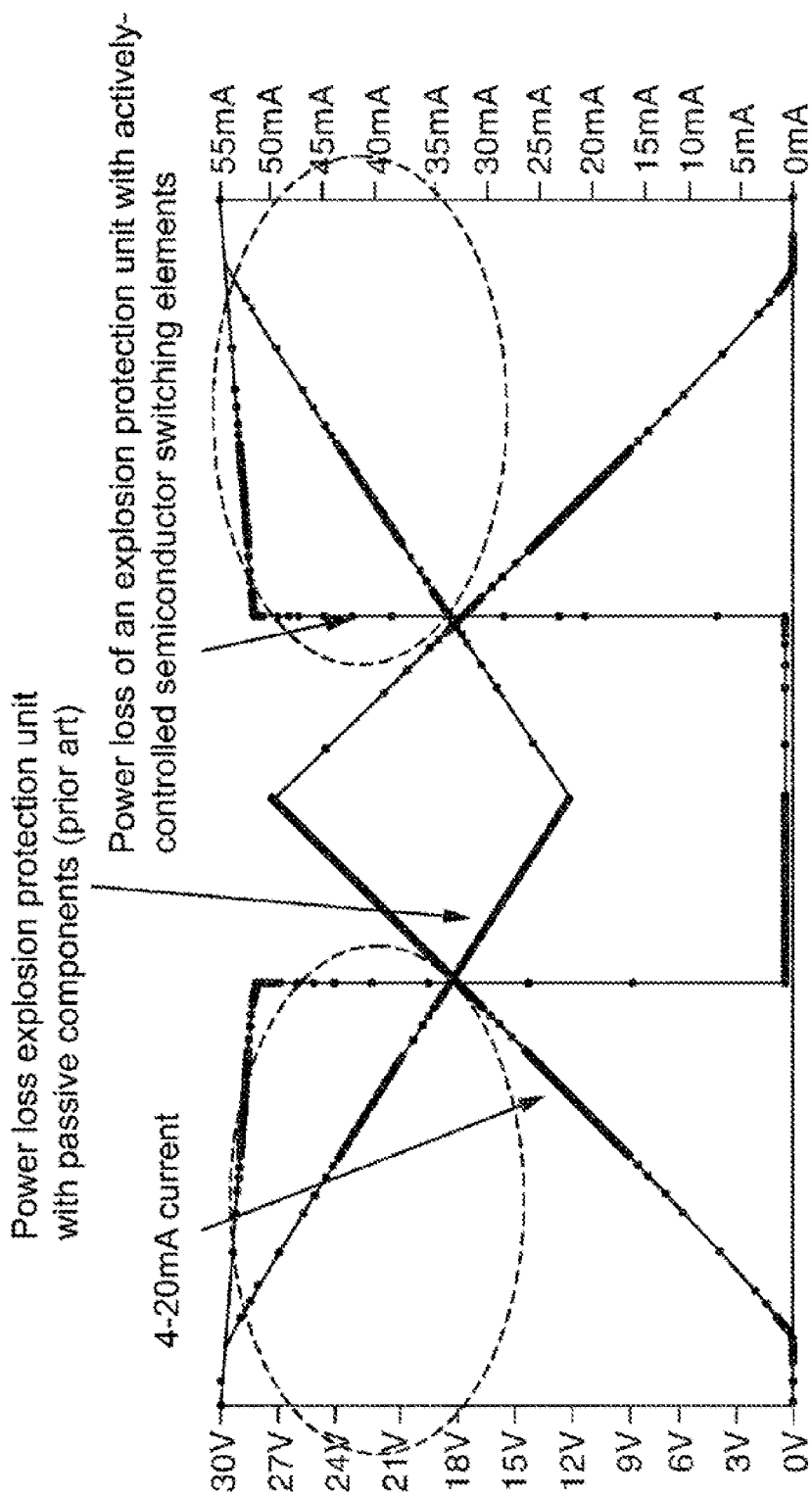
Figure 4C:
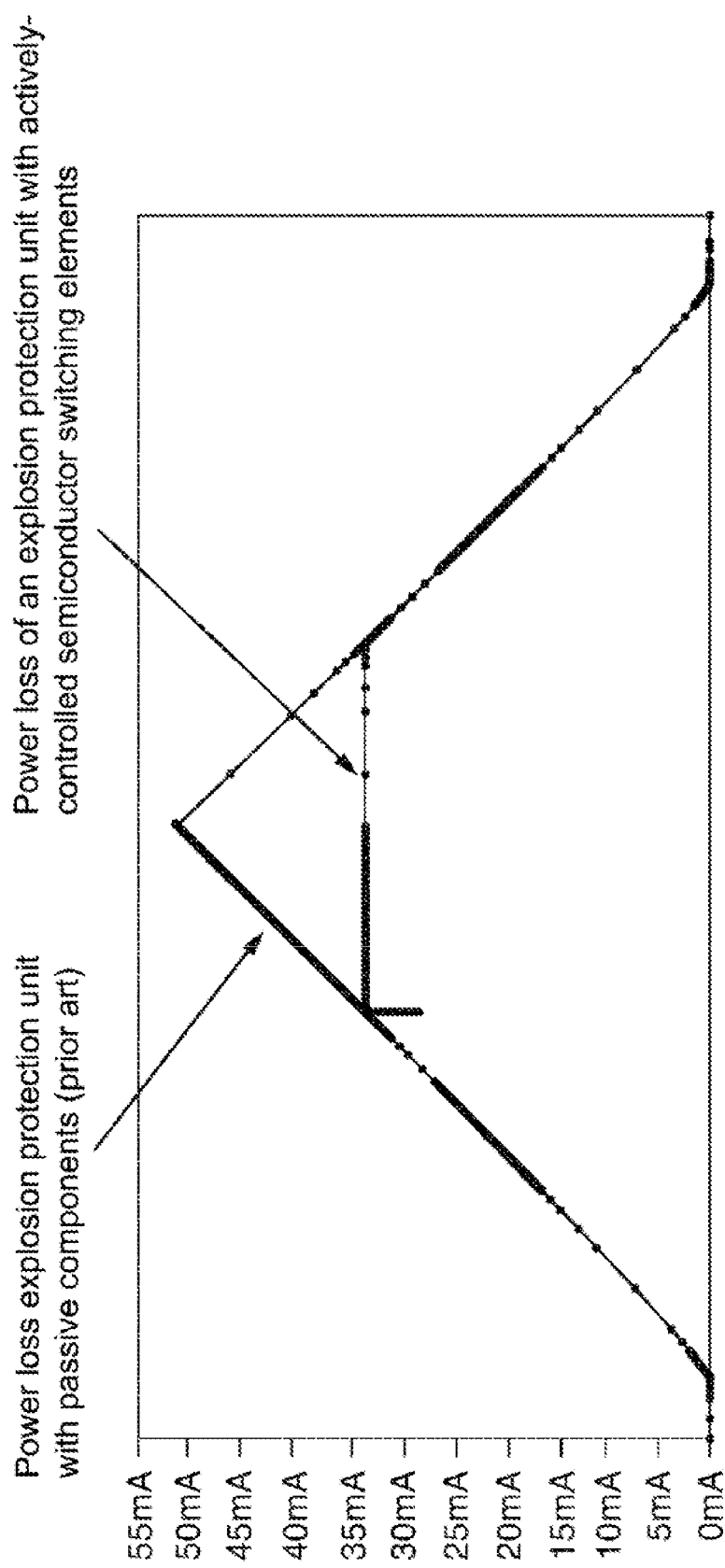

FIGS. 4a-4c show circuit simulations of the explosion protection unit 35, 38, designed according to the invention, with an actively-controlled semiconductor switching element in comparison with an explosion protection unit, known from the prior art, which consists of passive components, such as resistors, for example.

It can be clearly seen from FIGS. 4a and 4b that the explosion protection unit 35, 38 with semiconductor switching elements for current limitation generates a significantly lower voltage drop, and thus has a significantly lower power loss, than the explosion protection units known from the prior art with resistors or passive components (indicated in FIGS. 4a and 4b by dashed ovals). This meant that significantly more energy can accordingly be provided within the field device.

A further advantage of the explosion protection unit 35, 38 designed according to the invention is shown in FIG. 4c, in which the circuit is, as already mentioned, limited to a defined current, which can be seen in the following diagram. In the case of ohmic limitation, the current rises up to >50 mA, and, at the semiconductor limitation, to ≤40 mA.

The invention claimed is:

1. An intrinsically safe field device of automation technology for use in an explosion-hazard area, comprising:
  a first and a second connection terminal for connecting a two-wire line via which a current can be supplied;
  a sensor element or an actuator element for capturing or setting a process variable;
  field device electronics connected to the first and the second connection terminals, the field device electronics including:
    a current path from the first to the second connection terminal; and
    a voltage regulator incorporated into the current path, the voltage regulator being designed to provide, on the basis of the supplied current, a power supply at least for the sensor element or the actuator element, wherein the field device electronics are designed to transmit the process variable, captured via the sensor element, by setting the supplied current to a corresponding value, or to receive the process variable, to be set by the actuator element, by reading the supplied current and adjusting the actuator element accordingly; and
  an explosion protection unit, including:
    a first and a second actively-controllable switching element, incorporated into the current path in series; and
    a first and a second threshold value circuit designed such that the first threshold value circuit controls the first controllable switching element as a function of a first threshold value of the supplied current, and the second threshold value circuit controls the second controllable switching element as a function of a second threshold value of the supplied current such that, upon the first or the second threshold value being reached, the supplied current is limited to the first or the second threshold value,
    wherein the threshold value circuits are connected in parallel to the voltage regulator incorporated into the current path.

2. The intrinsically safe field device of automation technology according to claim 1, wherein the explosion protection unit further includes:
  a third, actively-controllable switching element incorporated into the current path in series with the first and the second switching elements; and
  a third threshold value circuit designed such that the third threshold value circuit controls the third controllable switching element as a function of a third threshold value of the supplied current, wherein the first, the second, and the third threshold value circuits are designed such that, upon the first, the second, or the third threshold value being reached, the current is limited to the first, the second, or the third threshold values, and wherein the third threshold value circuit is also connected in parallel to the voltage regulator incorporated into the current path.

3. The intrinsically safe field device of automation technology according to claim 2, wherein the first, the second, of the third threshold value of the current is greater than 22 mA.

4. The intrinsically safe field device of automation technology according to claim 3, wherein the first, the second, or the third threshold value circuits are designed such that at least two of the three threshold values are the same.

5. The intrinsically safe field device of automation technology according to claim 3, wherein the first, the second, or the third threshold value circuit is or are designed in such a way that at least two of the three threshold values of the current differ from one another.

6. The intrinsically safe field device of automation technology according to claim 2, wherein the actively-controllable switching elements each have a semiconductor switching element or a transistor.

7. The intrinsically safe field device of automation technology according to claim 2, wherein the threshold value circuits each include at least two transistors.

8. The intrinsically safe field device of automation technology according to claim 2, wherein the field device electronics further comprise a shunt resistor incorporated into the current path in series with the voltage regulator, wherein the field device electronics are further configured to read back the supplied current via the shunt resistor, and wherein, by at least one voltage tap across the shunt resistor, the first, the second, or the third threshold value circuit realizes or realize the first, the second, or the third threshold value of the current being reached.

9. The intrinsically safe field device of automation technology according to claim 8, wherein at least one of the threshold value circuits includes at least two transistors connected to one another and to the respective actively-controllable switching element and to the shunt resistor such that the respective switching threshold is determined by the shunt resistor.

10. The intrinsically safe field device of automation technology according to claim 2, wherein at least one of the threshold value circuits includes at least one comparator, a transistor, and a voltage divider connected to one another and to the respective actively-controllable switching element such that the respective switching threshold is determined by the voltage divider.

* * * * *